United States Patent
Su (10) Patent No.: US 7,011,355 B1
(45) Date of Patent: Mar. 14, 2006

(54) DUAL-PURPOSE CAR SUNSHADE CAPABLE OF ISOLATING HEAT AND ELIMINATING REFLECTION

(76) Inventor: Lao-Ching Su, No. 45, Jhongshan Rd., Central District, Taichung City (TW)

( * ) Notice: Subject to any disclaimer, the term of this patent is extended or adjusted under 35 U.S.C. 154(b) by 0 days.

(21) Appl. No.: 11/135,471

(22) Filed: May 24, 2005

(51) Int. Cl.
*B60J 3/00* (2006.01)

(52) U.S. Cl. ................................ 296/97.7; 296/97.8

(58) Field of Classification Search .............. 296/97.7, 296/39.1, 97.8, 97.1, 70
See application file for complete search history.

(56) References Cited

U.S. PATENT DOCUMENTS

| | | | | |
|---|---|---|---|---|
| 2,187,027 A | * | 1/1940 | Harvey | 296/97.7 |
| 2,207,224 A | * | 7/1940 | Meares | 160/264 |
| 2,791,272 A | * | 5/1957 | Stehlik | 160/290.1 |
| 2,813,749 A | * | 11/1957 | Wetig | 296/97.7 |
| 3,549,469 A | * | 12/1970 | Karl | 296/70 |
| 4,065,171 A | * | 12/1977 | Nagy | 296/97.7 |
| 4,560,245 A | * | 12/1985 | Sarver | 296/138 |
| 4,659,144 A | * | 4/1987 | Reese | 297/184.11 |
| 4,759,581 A | * | 7/1988 | McNamee | 296/97.7 |
| 4,997,226 A | * | 3/1991 | Grimes | 296/39.1 |
| 5,156,433 A | * | 10/1992 | Decker | 296/97.7 |
| 5,316,359 A | * | 5/1994 | Lansinger | 296/70 |
| 6,299,231 B1 | * | 10/2001 | Reitz | 296/97.7 |

* cited by examiner

*Primary Examiner*—Joseph D. Pape
(74) *Attorney, Agent, or Firm*—Rosenberg, Klein & Lee (57) ABSTRACT

A car sunshade includes first and second heat-isolating members; the first heat-isolating member is connected to a front internal board part above a dashboard of a car at a front end, and includes an upper tin foil, and a lower sheet, which is adhered to the upper tin foil, and has bamboo coal fibers; the second heat-isolating member has the same shape as the first one, and it includes an upper piece of cloth with bamboo coal fibers, and a lower tin foil adhered to the upper cloth; the first and the second heat-isolating members are joined together at rear edges thereof such that the sunshade can be folded to cover the front internal board part of the car to reduce reflection; the second heat-isolating member has rings at the front end for hanging the sunshade right behind the windscreen to block sunlight after the car is parked.

7 Claims, 9 Drawing Sheets

DUAL-PURPOSE CAR SUNSHADE CAPABLE OF ISOLATING HEAT AND ELIMINATING REFLECTION

BACKGROUND OF THE INVENTION

1. Field of the Invention

The present invention relates to a car sunshade, more particularly one, which can be hung behind the windscreen of a car to stop sunlight, and which can be folded to cover a front internal board part of a car, which is right above the dashboard of the car, thus reducing reflection of sunlight and preventing the front internal board part from being reflected on the windscreen.

2. Brief Description of the Prior Art

Figure 1:
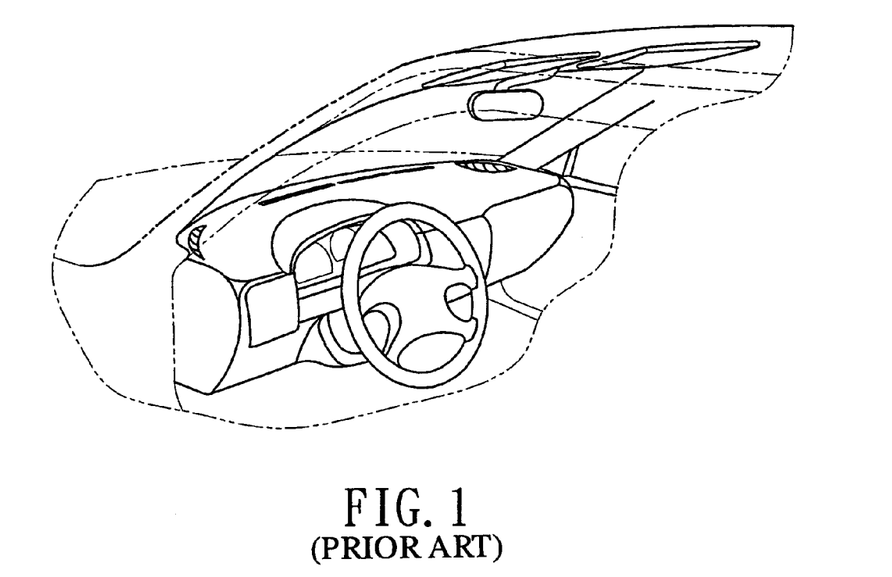
FIG. 1 is a partial rear perspective view of a prior art car.

Referring to FIG. 1, front internal board parts of cars, which are right above dashboards, are usually made of plastics. Therefore, the front internal board parts of cars will become very hot and fragile, and prone to get deformed after having been exposed to sun for a long period of time. And, various equipments of the cars will be very hot, and the air conditioning systems can't function efficiently. Consequently, the service life of the equipment of the cars will be shortened.

Figure 2:
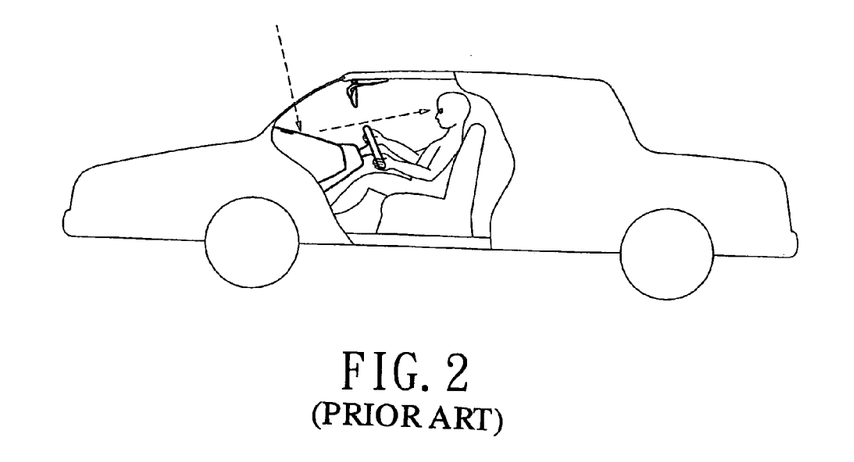
FIG. 2 a view of a prior art car with sunlight being reflected to the driver.

Referring to FIG. 2, when driving in bright sunlight, sunlight will be reflected from the front internal board parts of cars, and reflection of the front internal board parts will be present on the windscreens. Consequently, the drivers can't see clearly through the windscreens, and danger is likely to happen.

Figure 3:
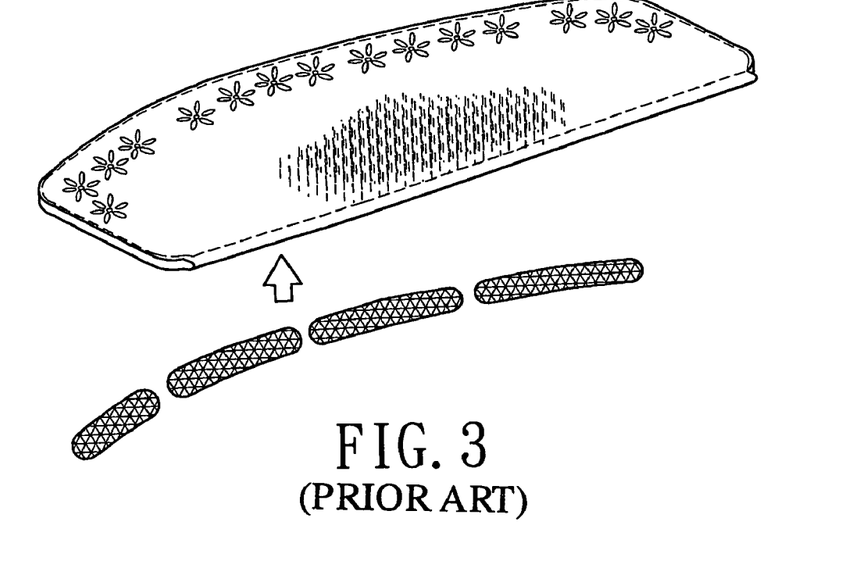
FIG. 3 is a perspective view of a prior art heat-absorbing sheet for a car.
Figure 4:
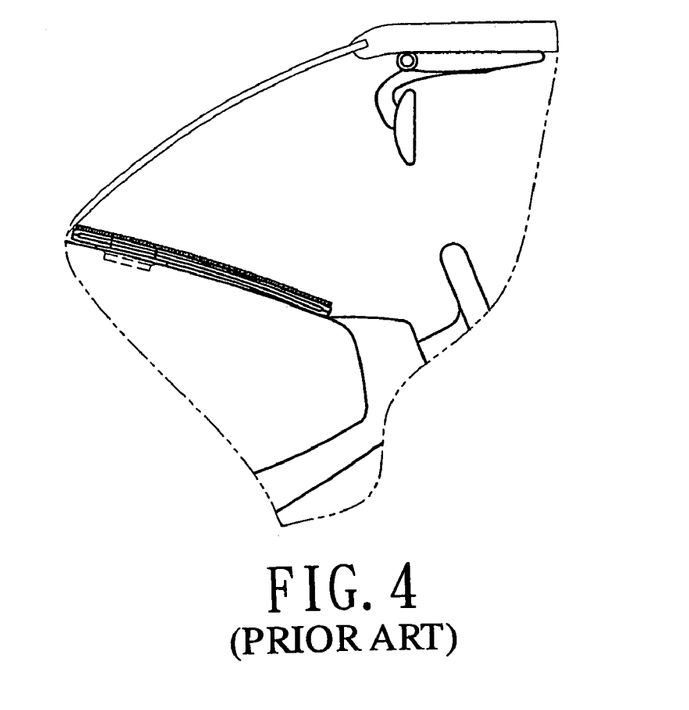
FIG. 4 is a side view of a car with the prior art heat-absorbing sheet.

To overcome the above-mentioned problem, referring to FIG. 3, a heat-absorbing sheet is made available, which is positioned on the front internal board part of a car to absorb heat produced by sunlight and to reduce reflection. The heat-absorbing sheet includes an upper blanket member, and lower plastic pads adhered to a lower side of the upper blanket member for preventing slip. However, some of the heat absorbed by the heat-absorbing sheet still will travel to the front internal board part, and the equipment under the board part. Therefore, there is still room for improvement.

Therefore, an improvement on a heat-absorbing sheet is made available, which includes an upper blanket member, a lower layer, and a heat-isolating layer sandwiched between the upper blanket member and the lower layer. However, the heat-absorbing sheet can only be used on the front internal board part of a car to absorb heat and reduce reflection, and in turn the user still has to prepare a sunshade for use when the car is parked in sunlight. Conventional car sunshades have to be manually stretched to cover a rear side of the windscreen, and they have to be removed, folded, and stored in a proper place in the car when they aren't in use, occupying a certain portion of the relatively small space in the cars. Therefore, the users still will encounter the inconvenience resulting from use of common conventional sunshades.

SUMMARY OF THE INVENTION

It is a main object of the invention to provide an improvement on a car sunshade, which is convenient to use, and can be positioned on the front internal board part of a car for use as a reflection-reducing sheet in driving. The car sunshade of the present invention includes first and second heat-isolating members. The first heat-isolating member is connected to a front internal board part of a car at a front end thereof, and includes an upper tin foil, and a lower sheet, which is adhered to the upper tin foil, and has bamboo coal fibers. The second heat-isolating member has the same shape as the first one, and it includes an upper piece of cloth with bamboo coal fibers, and a lower tin foil adhered to the upper cloth. The first and the second heat-isolating members are joined together at rear edges such that the sunshade can be folded to cover the front internal board part of the car to reduce reflection. The second heat-isolating member has rings at a front end for hanging the sunshade right behind the windscreen of the car.

BRIEF DESCRIPTION OF THE DRAWINGS

The present invention will be better understood by referring to the accompanying drawings, wherein.

DETAILED DESCRIPTION OF THE PREFERRED EMBODIMENTS

Referring to FIGS. 5 to 8, a first preferred embodiment of a car sunshade includes a first heat-isolating member 1, and a second heat-isolating member 2.

The first heat-isolating member 1 includes an upper sheet 11, and a lower sheet 12. The upper sheet 11 is a tin foil, and it positioned over and stuck to the lower sheet 12 by means of soft glue. Or alternatively, the upper sheet 11 can be an aluminum foil, a PET film, a plated film, or a fireproof sheet. The lower sheet 12 is made of non-woven fabrics with short fibers. Furthermore, the short fibers of the lower sheet 12 are processed so as to include bamboo coal fibers 13, which will absorb detrimental substance, eliminate bad odors, and kill germs. The first heat-isolating member 1 is formed with several cuts 14 such that it will closely touch a front internal board part of a car that is right above the dashboard when positioned over the board part.

The second heat-isolating member 2 has the same shape as the first heat-isolating member 1, and it includes an upper sheet 21, and a lower sheet 22 adhered together. The upper sheet 21 is a piece of cloth with either short fibers or long fibers, e.g. blanket, and down cloth; thus, when the upper sheet 21 is positioned over a front internal board part of a car, which is right above the dashboard, it will reduce reflection of sunlight, and prevent reflection of the front internal board part from forming on the windscreen. Furthermore, the upper sheet 21 is processed such that the fibers thereof include bamboo coal fibers 23, which will eliminate bad odors, and kill germs. And, far infrared rays will be produced when sunlight travels to the bamboo coal fibers 23. The lower sheet 22 is a tin foil. Or alternatively, the lower sheet 22 can be an aluminum foil, a PET film, a plated film, or a fireproof sheet. The second heat-isolating member 2 is formed with several cuts 24 such that when positioned over a front internal board part of a car, it will closely touch the front internal board part.

Figure 7:
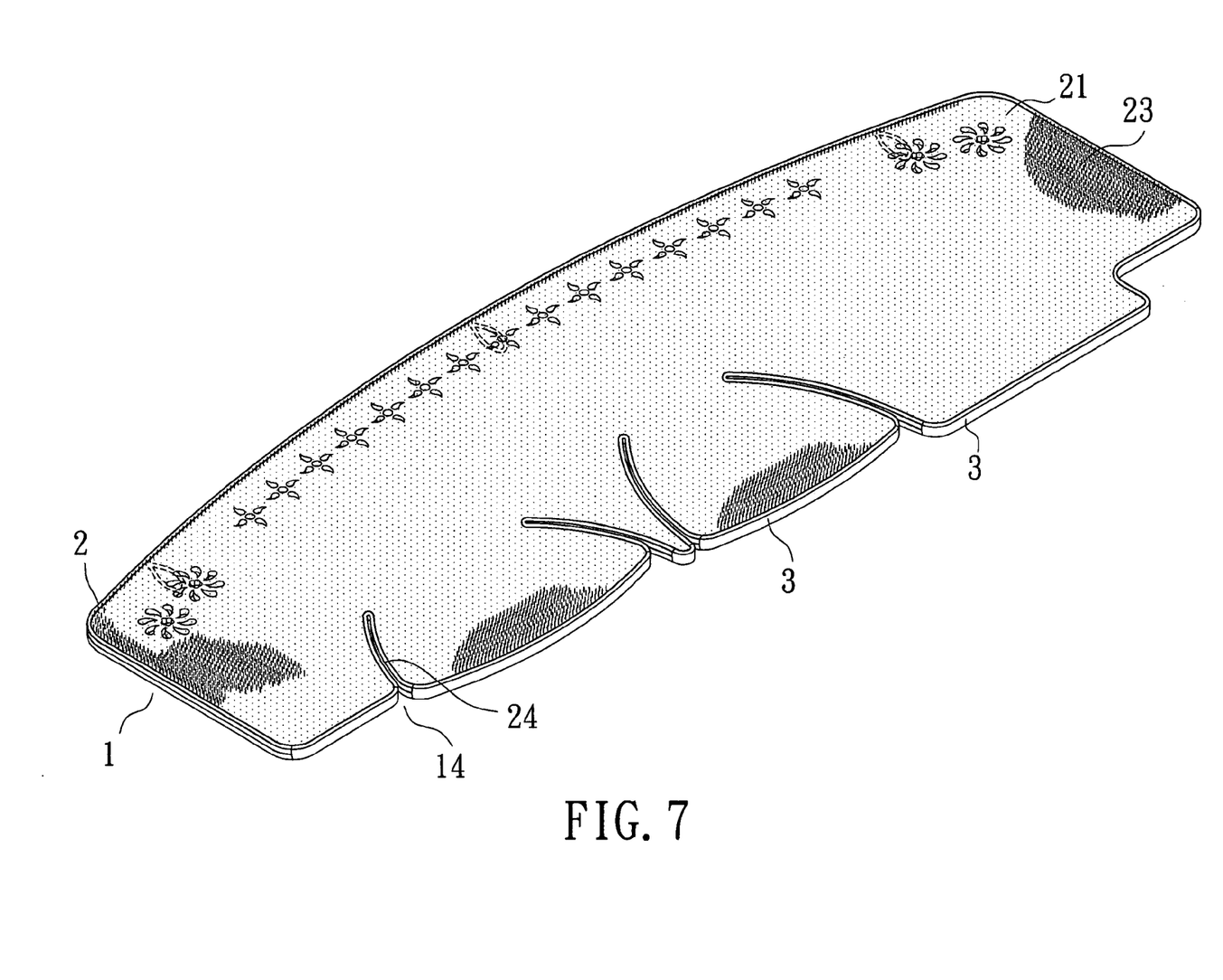
FIG. 7 is a perspective view of the sunshade in a folded position.
Figure 8:
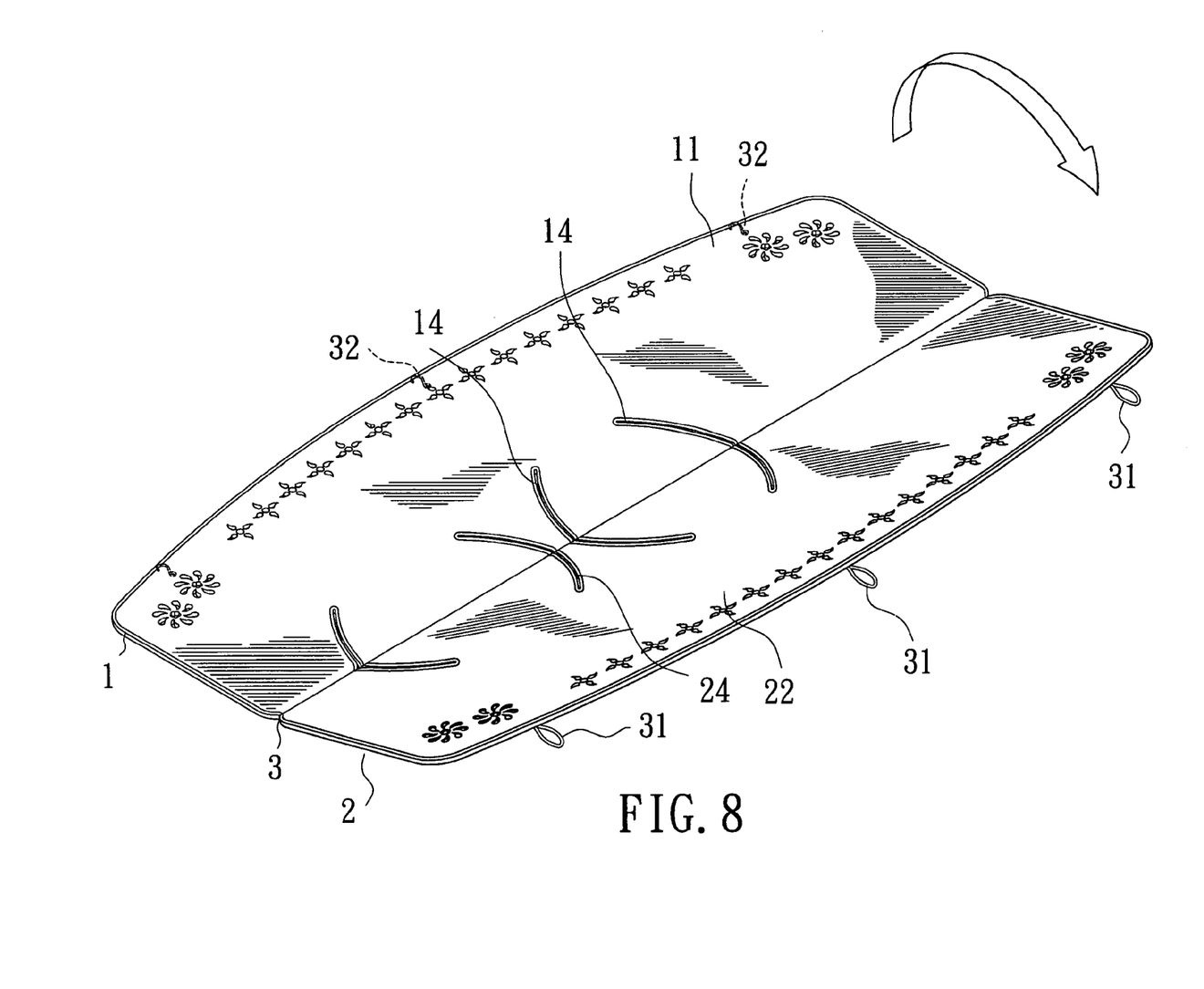
FIG. 8 is a perspective view of the sunshade in a stretched position.

The first and the second heat-isolating members 1 and 2 are joined together at rear edges thereof by means of elongate connecting members 3 such that the complete car sunshade can be folded at the join between the first and the second heat-isolating members 1 and 2, as shown in FIGS. 7 and 8.

Figure 5:
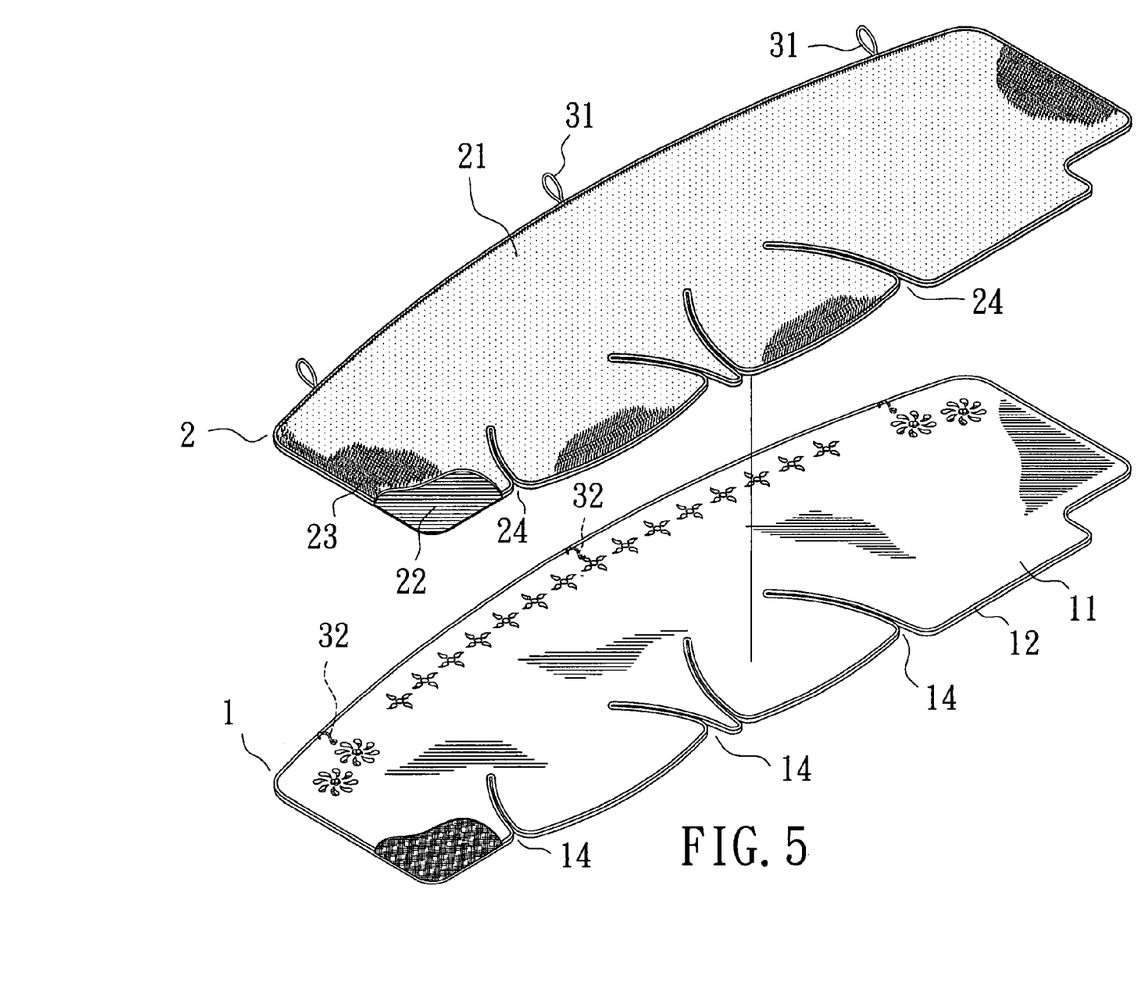
FIG. 5 is an exploded perspective view of the car sunshade of the present invention.
Figure 6:
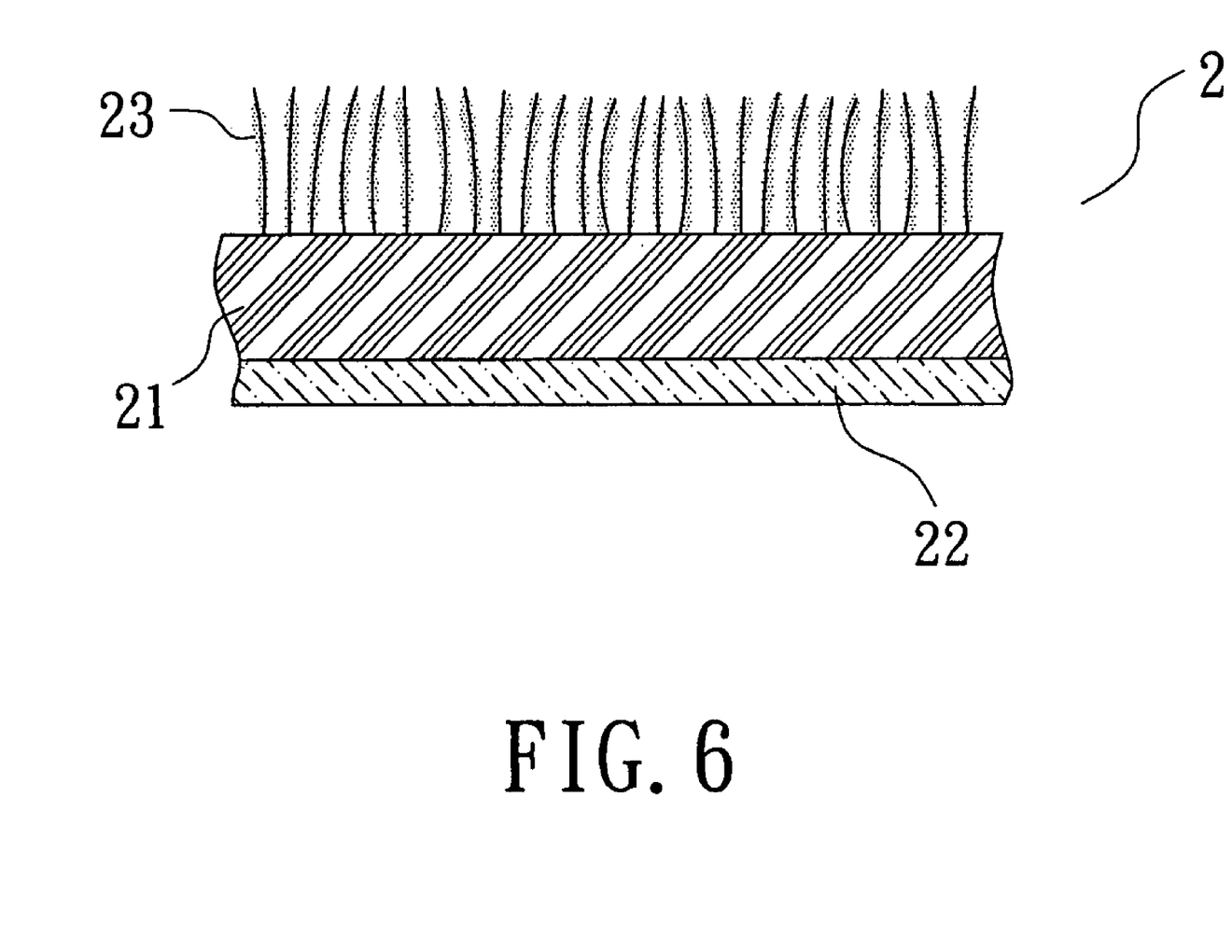
FIG. 6 is a partial cross-sectional view of the present sunshade.

The first heat-isolating member 1 has several hooks 32 joined to a front end portion of a lower side thereof, and the second heat-isolating member 2 has several hanging rings 31 joined to a front edge thereof.

Figure 9:
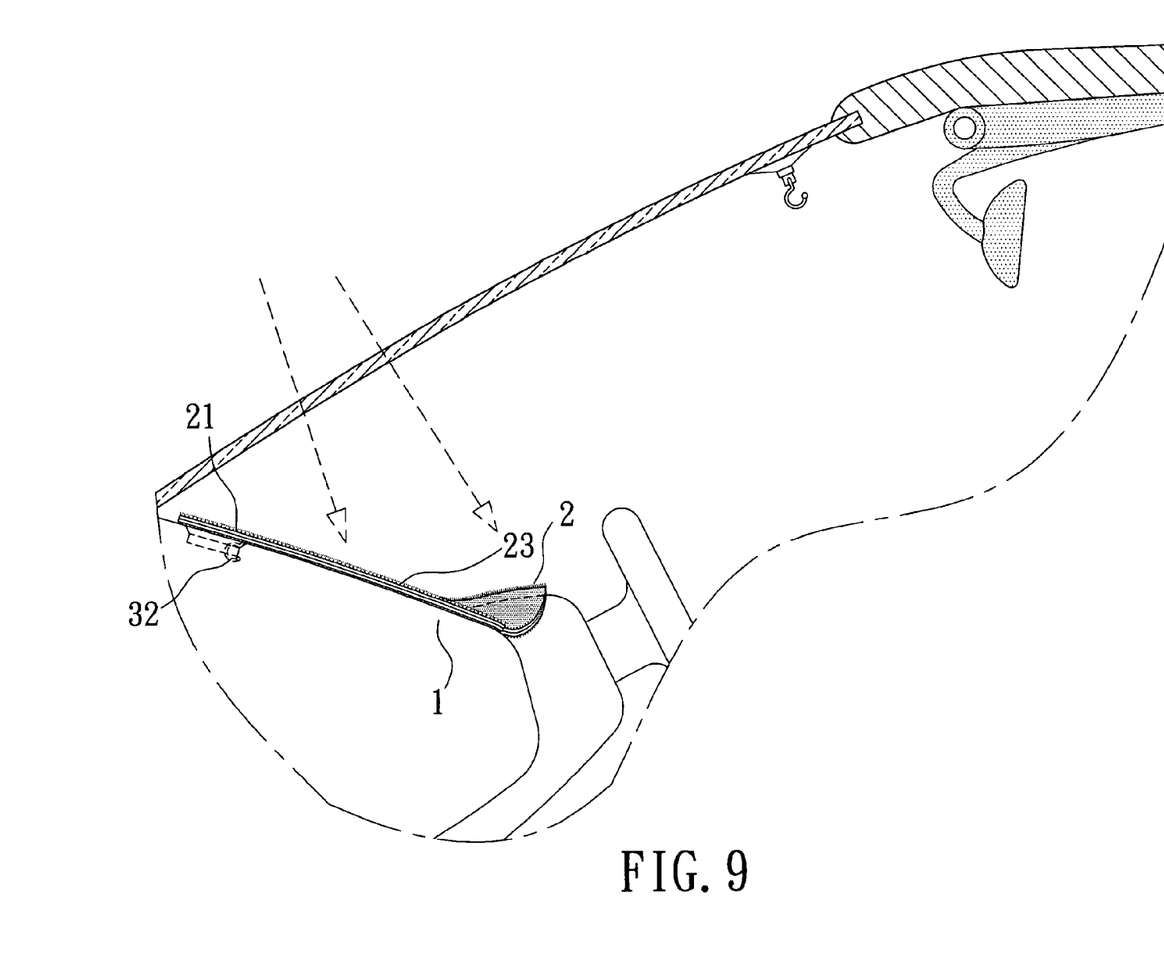
FIG. 9 is a view showing the first way to use the present sunshade.

Referring to FIGS. 7 and 9, the sunshade is folded with the second heat-isolating member 2 being on top of the first heat-isolating member 1, and the sunshade is positioned over a front internal board part of a car, which is right above the dashboard, with the hooks 32 being connected to vent holes of an air conditioning system of the car. Thus, when one is driving the car in bright sunlight, the sunshade will reduce reflection of sunlight, and prevent reflection of the front internal board part of the car from forming on the car windscreen. In addition, the bamboo coal fibers 23 of the second heat-isolating member 2 will help far infrared rays to be produced in the presence of sunlight, and absorb and decompose detrimental substance, and eliminate bad odors in the car.

Figure 10:
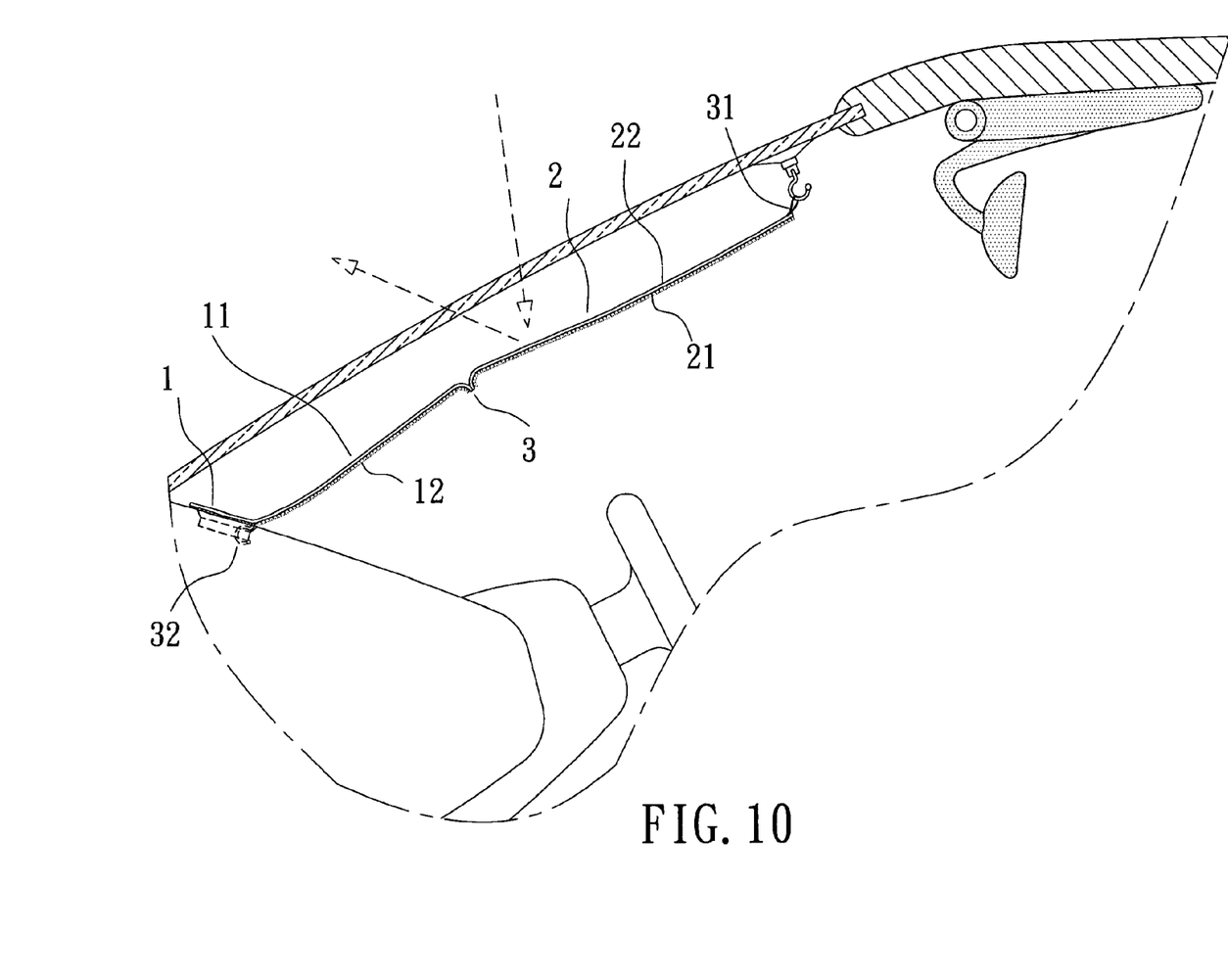
FIG. 10 is a view showing the second way to use the sunshade.

Referring to FIG. 10, after the car is parked, the sunshade is stretched, and the hanging rings 31 are connected to supporting elements (not numbered), which are secured in position near to the upper edge of the windscreen. Thus, sunlight is blocked by means of both the upper sheet 11 of the first heat-isolating member 1 and the lower sheet 22 of the second heat-isolating member 2, which are tin foils, and can't travel through the front portion of the car. Consequently, the inside of the car can't be overheated by sunlight.

Figure 11:
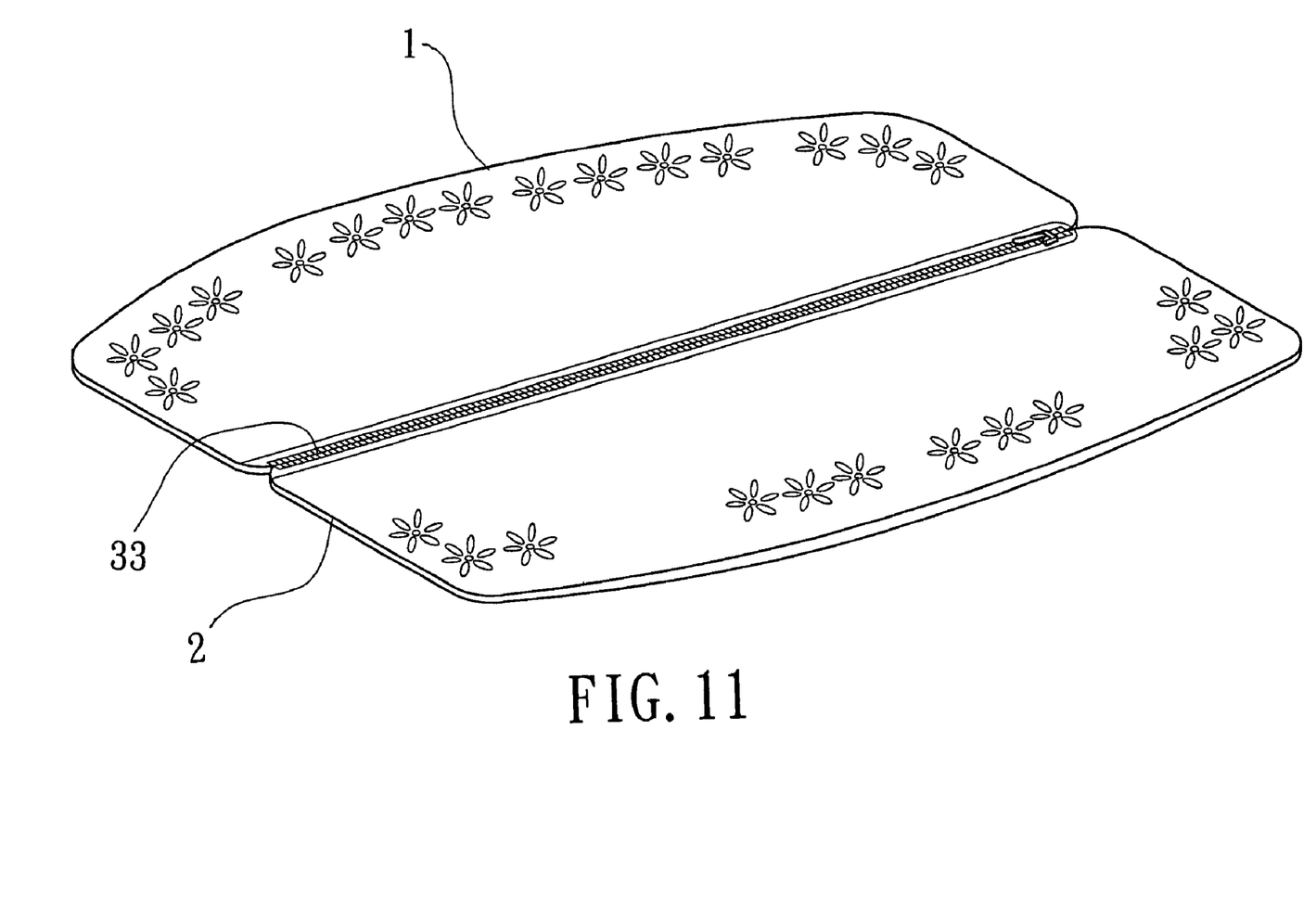
FIG. 11 is a perspective view of the second preferred embodiment.

Referring to FIG. 11, a zipper 33 is joined to the rear edges of the first and the second heat-isolating members 1 and 2 instead; thus, the first and the second heat-isolating members 1 and 2 can be separated from each other for allowing the users to clean them with ease, and they can be replaced with a new one alone.

What is claimed is:

1. A car sunshade, comprising
   (a) a first heat-isolating member; the first heat-isolating member being positioned on a front internal board part of a car, which is right above a dashboard of the car; the first heat-isolating member being connected to the front internal board part at a front end portion thereof; the first heat-isolating member including:
   an upper sheet of tin foil for reflecting sunlight;
   a lower sheet adhered to a lower side of the upper sheet; the lower sheet being made of non-woven fabrics with short fibers; the short fibers of the lower sheet being processed so as to include bamboo coal fibers;
   the first heat-isolating member being formed with a plurality of cuts thereon;
   (b) a second heat-isolating member having a shape that is the same as that of the first heat-isolating member; the second heat-isolating member including:
   an upper piece of cloth with long fibers; the upper piece of cloth being processed so as to have bamboo coal fibers; and
   a lower sheet of tin foil adhered to a lower side of the upper sheet for reflecting sunlight;
   the second heat-isolating member having a plurality of hanging rings connected to a front end thereof;
   the first and the second heat-isolating members being joined together at a joint between rear edges thereof such that the complete car sunshade can be folded at the joint between the first and the second heat-isolating members;
   the second heat-isolating member covering and touching touch the first heat-isolating member when the sunshade is in a folded position;
   the first and the second heat-isolating members together covering a rear side of a windscreen of the car when the hanging rings of the second heat-isolating member are connected to respective supporting elements of the car, which are secured in position near to an upper edge of the windscreen.

2. The car sunshade as claimed in claim 1, wherein a plurality of hooks are secured to a front end portion of a lower side of the first heat-isolating member, and connected to vent holes of an air conditioning system of the car.

3. The car sunshade as claimed in claim 1, wherein both the upper sheet of the first heat-isolating member and the lower sheet of the second heat-isolating member are aluminum foils instead.

4. The car sunshade as claimed in claim 1, wherein both the upper sheet of the first heat-isolating member and the lower sheet of the second heat-isolating member are PET films instead.

5. The car sunshade as claimed in claim 1, wherein both the upper sheet of the first heat-isolating member and the lower sheet of the second heat-isolating member are plated films instead.

6. The car sunshade as claimed in claim 1, wherein both the upper sheet of the first heat-isolating member and the lower sheet of the second heat-isolating member are fireproof sheets instead.

7. The car sunshade as claimed in claim 1, wherein a zipper is joined to the rear edges of both the first and the second heat-isolating members.

* * * * *